United States Patent [19]

Frank et al.

[11] Patent Number: 5,283,494
[45] Date of Patent: Feb. 1, 1994

[54] APPARATUS FOR FEEDING FUEL TO A MOTOR VEHICLE ENGINE FROM A FUEL TANK

[75] Inventors: Kurt Frank, Schorndorf-Haubersbronn; Hartmuth Kraemer, Ditzingen; Werner Scholten, Stuttgart; Ernst Zolda, Korntal-Münchingen, all of Fed. Rep. of Germany

[73] Assignee: Robert Bosch GmbH, Stuttgart, Fed. Rep. of Germany

[21] Appl. No.: 918,268

[22] Filed: Jul. 22, 1992

[30] Foreign Application Priority Data

Jul. 31, 1991 [DE] Fed. Rep. of Germany ....... 4125282

[51] Int. Cl.⁵ ............... H02K 11/00; H02K 13/00; H01R 39/50; F04B 35/02
[52] U.S. Cl. ................ 310/239; 310/68 R; 310/222; 417/423.7
[58] Field of Search ........... 310/239, 52, 68 R, 222, 310/240, 241, 242, 244–247; 361/2, 23; 417/423.7

[56] References Cited

U.S. PATENT DOCUMENTS

| | | | |
|---|---|---|---|
| 4,350,909 | 9/1982 | Yamada | 310/62 |
| 4,399,383 | 8/1983 | Kamiyama | 310/233 |
| 4,538,085 | 8/1985 | Tanaka | 310/239 |
| 4,694,211 | 9/1987 | Bayha et al. | 310/71 |
| 4,768,931 | 9/1988 | Iwai et al. | 417/366 |
| 5,175,464 | 12/1992 | Smith | 310/239 |

FOREIGN PATENT DOCUMENTS 3016086 11/1980 Fed. Rep. of Germany .
2047980 3/1980 United Kingdom .

Primary Examiner—Steven L. Stephan
Assistant Examiner—D. R. Haszko
Attorney, Agent, or Firm—Michael J. Striker

[57] ABSTRACT

The apparatus for feeding fuel to a motor vehicle engine from a fuel tank includes a pump portion and a direct current drive motor located in a housing part and through which the fuel flows. The commutator device of the drive motor includes commutator brushes located on the positive side and on the negative side; brush contact springs made from electrically conductive material located on the positive side and on the negative side, and a collector having a sliding surface for the brushes which are pressed on it during operation by the contact springs. To improve reliability of operation of the apparatus a negative potential is applied to the brush contact springs on the positive side and on the negative side and the brush contact springs on the positive side are electrically insulated from the commutator brushes on the positive side.

4 Claims, 1 Drawing Sheet

APPARATUS FOR FEEDING FUEL TO A MOTOR VEHICLE ENGINE FROM A FUEL TANK

BACKGROUND OF THE INVENTION

The present invention relates to an apparatus for supplying or feeding fuel to a motor vehicle engine from a fuel tank. The invention also relates to a method for improving the reliability of operation of the apparatus for feeding fuel.

An apparatus for feeding fuel of this type is known and includes a pump portion and a direct current-drive motor through which fuel flows mounted in a housing part, which is provided with a commutator device, which has a collector, on whose sliding surface commutator brushes, which are part of the operating circuit of the drive motor, are pressed during operation of the drive motor by brush contact springs made from electrically conductive material.

So that this known fuel feed apparatus (DE-OS 30 16 086) can also be used for feeding a medium which acts like an electrolyte, the individual wires of copper conductor leading from the electrical terminals to the carbon brushes located in a box or pot-like housing or guide are enclosed in a protective jacket made from Nickel, Zinc, Silver or Aluminum. This is because in the alcohol fuel currently under consideration, which contains for example 15% methanol (M 15), the electrical conductivity is in the Micro-Siemens Region (uS). This is based on the fact that methanol combines with water. Pure methanol (M 100) or ethanol (E 100) fuel increases its conductivity, because of oxidation susceptibility and with it formation of formic acid (in M 100) and/or formation of acetic acid (in E 100). In regard to electrical conductivity in the Micro-Siemens Region, these fluids already act as electrolytes so that because of the potential differences in the electric motor a deposit occurs, particularly on the bare conductors which are exposed to the flowing fuel on the anode side.

With the conventional fuel, whose conductivity is in the Pico-Siemens Region (ps), these considerations play no roll. The features known from the above-mentioned state of the art for preventing the mentioned electroerosion stiffen the brush wires so much that the proper contact of the brushes on the contact surface of the commutator is no longer guaranteed under action of the conventional brush contact springs formed as coil springs. However a compensating stiffening of the contact springs increases the wear on the carbon brushes and lowers the efficiency of the electrical drive motor and thus also the fuel feed unit. Further background of the problems are described in DE-OS 30 16 086. Express reference is made to this publication so that the disclosure of that publication can be considered as part of the disclosure of this application.

SUMMARY OF THE INVENTION

It is an object of the present invention to provide an improved apparatus for feeding fuel to a motor vehicle engine from a fuel tank which does not have the above-mentioned disadvantage.

It is also an object of the present invention to provide an improved more reliable method of operating an apparatus for feeding fuel to a motor vehicle engine from a fuel tank.

This object and others which will be made more apparent hereinafter are attained in an apparatus for feeding fuel to a motor vehicle engine from a fuel tank, comprising a pump portion and a direct current drive motor located in a housing part and through which the fuel flows, which is provided with a commutator device and has a positive side and a negative side. The commutator device includes commutator brushes made from electrically conductive material, at least one of the commutator brushes being on each of the positive and negative sides; brush contact springs, at least one of the brush contact springs being on each of the positive and negative sides, and a collector, on whose sliding surface the commutator brushes are pressed during operation of the drive motor by the brush contact springs.

According to the invention, means for applying a negative potential to the at least one brush contact spring on the positive side and the at least one brush contact spring on the negative side are provided as well as means for electrically insulating the at least one brush contact spring on the positive side from the commutator brush on the positive side.

In a preferred embodiment of the invention the at least one contact spring on the negative side contacts directly on the commutator brush on the negative side and is connected by conductor means with the at least one contact spring on the positive side. Both contact springs can be connected by an intervening member formed on them with the conductor means.

A method of improving the reliability of operation of the apparatus is also provided, including applying a negative potential to all of the contact springs and insulating the contact springs on the positive side from the commutator brush on the positive side.

BRIEF DESCRIPTION OF THE DRAWING

The objects, features and advantages of the resent invention will now be illustrated in more detail by the following detailed description, reference being made to the accompanying drawing in which.

DETAILED DESCRIPTION OF THE PREFERRED EMBODIMENT

Figure 1:
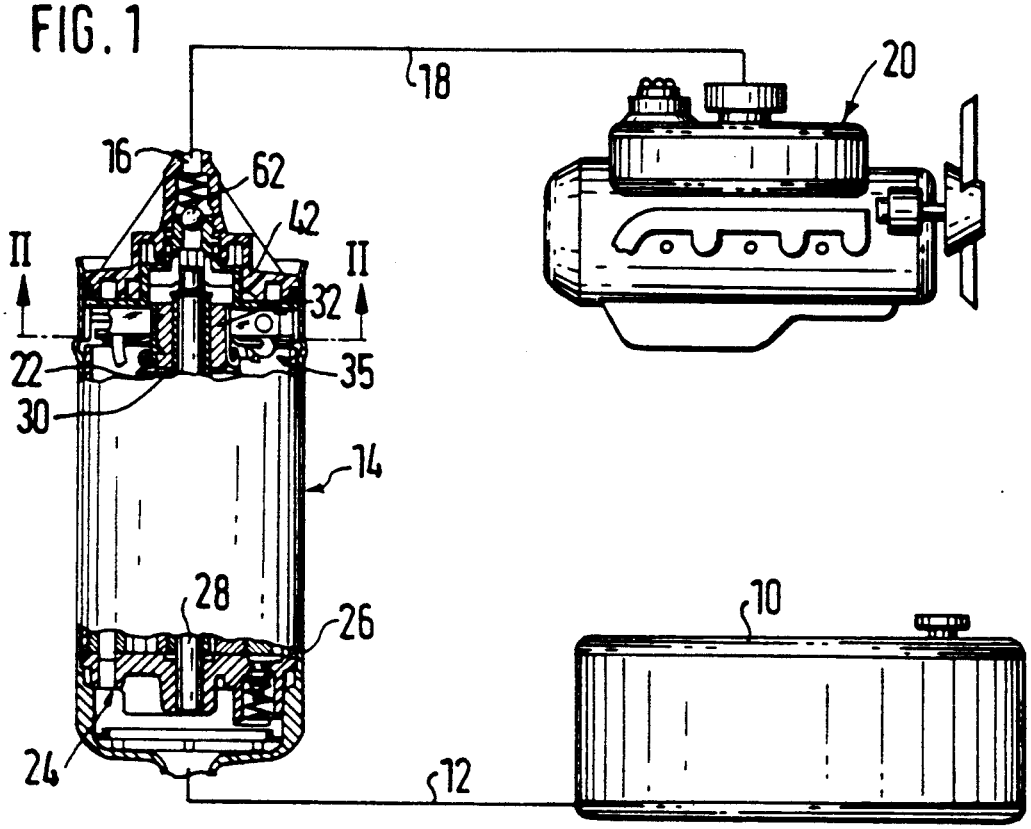
FIG. 1 is a partially diagrammatic, partially cross-sectional view of an apparatus for feeding fuel to a motor vehicle engine from a fuel tank according to the present invention.
Figure 2:
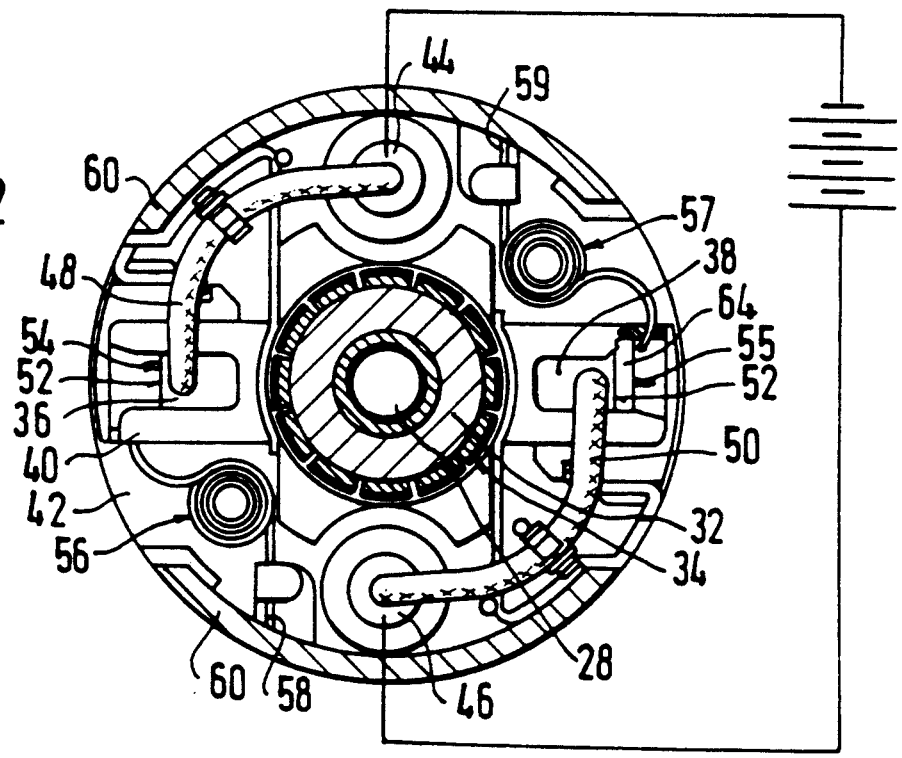
FIG. 2 is a cross sectional view through a fuel feeding apparatus according to FIG. 1 taken along the section line II—II of FIG. 1.

An apparatus shown in FIG. 1 for feeding of fuel from a fuel tank 10 is connected by a vacuum line 12 with the low pressure or vacuum side of a motor vehicle fuel feed apparatus 14. A high pressure connector 16 of the fuel feed apparatus 14 connects to a high pressure line 18, which delivers fuel to an internal combustion engine 20 of a motor vehicle, the details of which are not shown. During operation of the fuel feed apparatus 14 fuel is drawn from the fuel tank 10 by the fuel feed apparatus 14 and is fed over the high pressure line 18 to the internal combustion engine 20. The fuel feed apparatus 14 includes a pump portion 24 and a drive motor 22 which can be a direct current electric motor, which is connected to and drives the pump portion 24 of the fuel feed apparatus 14. The fuel feed apparatus 14 has a stationary axle 28 attached rigidly to the housing 26 of the fuel feed apparatus, on which a hollow armature 30 of the drive motor 22 is rotatably mounted. The motor armature 30 is further provided with a so-called drum collector 32, on whose jacket or sliding surfaces 34 commutator brushes 36 and 38 contact. The drum collector 32 is part of a commutator device 35 of the drive motor 22, to which also the commutator brushes 36,38 belong. These are guided substantially radially slidably in a so-called brush guides 40 relative to the collector 32. The brush guides 40 are associated with a housing cover 42. The housing cover 42 is part of the housing 26 of the fuel feed apparatus 14. It is made of an insulating material is penetrated by electrically conductive connecting bolts 44,46. The working circuit of the direct current motor 22 is closed at the unshown outer ends of the connecting bolts 44,46. Electrical conductors in the form of wire strands 48,50 lead from the connecting bolts 44,46 to the commutator brushes 36,38. In the following description of the invention it is assumed that the connecting bolt 44, the wire strand 48 and the commutator brush 35 are connected in the negative side N of the working circuit. In contrast the positive side P of the working circuit of the drive motor 22 should be connected to the connecting bolt 46. Also the wire strand 50 and the commutator brush 38 are part of the positive side P of the working circuit. As FIG. 2 shows, the end surfaces 52 of commutator brushes 36,38 facing the sliding surfaces 34 of the drum collector 32 are pressed inwardly toward the sliding surface 34 by spring legs or leaf springs 56 and 57. FIG. 2 shows that the brush springs 56 and 57 with extensions or intervening pieces 58 and/or 59 contact on a housing member 60 of the drive motor 22, which is made of an electrically conductive material and acts as part of a means for connecting the brush springs electrically to keep them at the same negative potential, which can be provided by battery B. This piece can be formed by a ground body, to which unshown permanent magnets of the direct current motor 22 are rigidly attached in a known way. Finally it is worth noting that the positive side wire strand 50 in the embodiment shown is covered by a plastic insulating tube so that the medium to be fed, which is forced through the housing 26 by the unit, until it leaves by a nonreturn valve 62 the feed unit through the high pressure connector 16, is protected. Further also the inner side observable in FIG. 2 of the positive side connecting bolt 46 is covered by a layer IL, which similarly is resistant to the medium being fed. This layer is made from a material like the tube covering for the wire strand 50. Extending from the negative side connecting bolt 54 negative potential is applied to the following parts of the commutator device 35: wire conductor 48, commutator brushes 36, ends 54 of the commutator contact springs 56, intervening piece 58 of the brush contact spring 56 and the intervening piece 59 of the positive side brush contact spring 57 and the end 55 of this contact spring via the housing element 60 serving as the connective means. Positive potential is applied to commutator brush 38, the wire strand 50 covered exteriorly by the sheath and the connecting bolt 46 covered by the protective layer. To avoid a short circuit between the ends 55 of the contact spring 57(negative potential) and the end surfaces 52 of the commutator brush 38 (positive potential) these structural components are insulated electrically from each other by an intervening part of an insulating member 64 or some suitably covered component. Thus it is guaranteed that all electroerosion endangered metal parts of the direct current motor 22 are reliably protected from electroerosion.

It will be understood that each of the elements described above, or two or more together, may also find a useful application in other types of constructions differing from the types described above.

While the invention has been illustrated and described as embodied in an apparatus for feeding fuel to a motor vehicle engine from a fuel tank, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

We claim:

1. In an apparatus for feeding fuel to a motor vehicle engine from a fuel tank, comprising a housing part, a pump portion and a direct current drive motor located in the housing part, the direct current drive motor being provided with a commutator device and having a positive side and a negative side, the commutator device including commutator brushes, at least one of the commutator brushes being located on the positive side and at least one of the commutator brushes being located on the negative side; brush contact springs made from electrically conductive material, at least one of the brush contact springs being located on the positive side and at least one of the brush contact springs being located on the negative side, and a collector having a sliding surface, the commutator brushes being pressed on the sliding surface of the collector during operation of the drive motor by the brush contact springs, the improvement comprising means for applying a negative potential to both the at least one brush contact spring on the positive side and the at least one brush contact spring on the negative side and means for electrically insulating the at least one brush contact spring on the positive side from the at least one commutator brush on the negative side so as to improve the reliability of operation of the drive motor.

2. The improvement as defined in claim 1, wherein the at least one brush contact spring on the negative side contacts directly on the at least one commutator brush on the negative side and is conductively connected with the at least one brush contact spring on the positive side.

3. The improvement as defined in claim 2, wherein each of the at least one brush contact, springs on the positive side is conductively connectable with each of the at least one brush contact springs on the negative side by an intervening member.

4. A method of improving reliability of operation of an apparatus for feeding fuel from a fuel tank of a motor vehicle to a motor vehicle engine, the apparatus for feeding fuel comprising a housing part, a pump portion and a direct current drive motor located in the housing part and through which the fuel flows, the direct current drive motor being provided with a commutator device and having a positive side and a negative side, the commutator device including commutator brushes, at least one of the commutator brushes being located on the positive side and at least one of the commutator brushes being located on the negative side; brush contact springs made from electrically conductive material, at least one of the brush contact springs being located on the positive side and at least one of the brush contact springs being located on the negative side, and a collector having a sliding surface, the commutator brushes being pressed on the sliding surface during operation of the drive motor by the brush contact springs, the method comprising the steps of applying a negative potential to both the at least one brush contact springs on the positive side and the at least one brush contact spring on the negative side and electrically insulating the at least one brush contact spring on the positive side from the at least one commutator brush on the positive side.

* * * * *